Sept. 28, 1926.                                                 1,601,031
                        D. McLEAN
             PEDESTRIAN SAVING MEANS FOR AUTOMOBILES
                      Filed Nov. 20, 1925
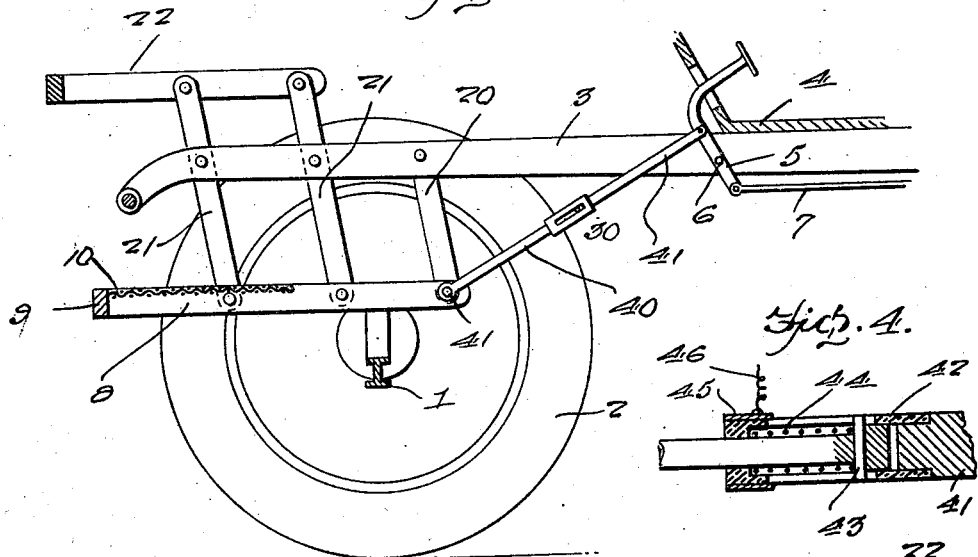
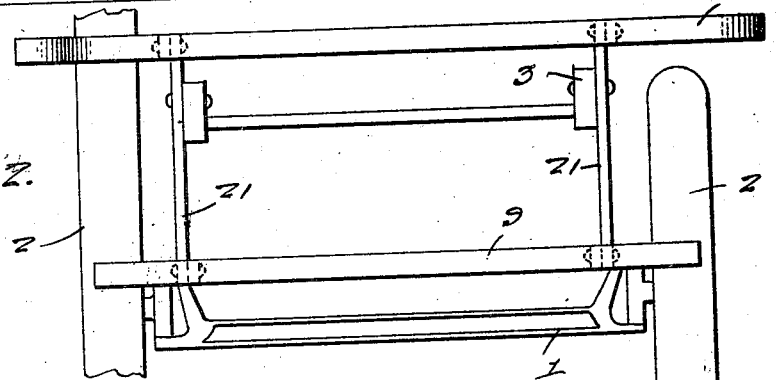
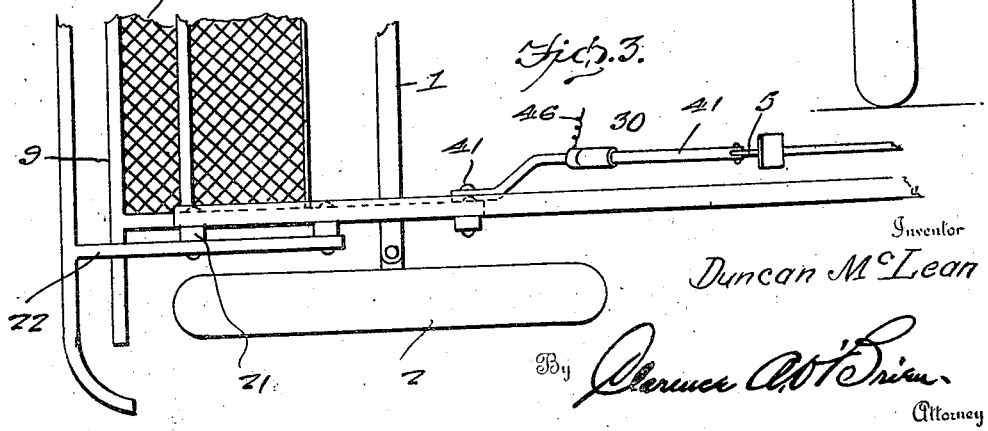
Inventor
Duncan McLean
By
    Attorney Patented Sept. 28, 1926.

1,601,031

UNITED STATES PATENT OFFICE.

DUNCAN McLEAN, OF DELAND, FLORIDA.

PEDESTRIAN-SAVING MEANS FOR AUTOMOBILES.

Application filed November 20, 1925, Serial No. 70,418, and in Great Britain December 6, 1924.

My present invention pertains to automobile equipment, and it has for one of its objects to provide efficient means for saving a pedestrian against serious injury in the event of the pedestrian being run down by the automobile, the said means being automatic in action and characterized by the capacity to carry the pedestrian and in that way prevent the pedestrian being run over by the automobile.

Another object of the invention is the provision of means controlled by the pedestrian saving means for automatically applying the brakes of the automobile.

Another object is the provision in combination with the pedestrian saving means, of means whereby the ignition circuit of the internal combustion engine complementary to the automobile will be automatically interrupted when the pedestrian saving means is put in operation by contact with a pedestrian.

Other objects and practical advantages of the invention will be fully understood from the following description and claims when the same are read in connection with the drawings, accompanying and forming part of this specification, in which:—

Figure 1 is a longitudinal vertical section showing the preferred embodiment of my invention and also showing so much of an automobile as is necessary to make clear the application of the improvement to the automobile.

Figure 2 is a front elevation of the same.

Figure 3 is a fragmentary plan view illustrative of the connection 30 hereinafter explicitly described.

Figure 4 is an enlarged fragmentary section illustrative of the means whereby the ignition circuit of the internal combustion engine of the automobile is interrupted.

Similar numerals of reference designate corresponding parts in all of the views of the drawings.

The front axle of the automobile is designated by 1, the front wheels by 2, and the automobile frame by 3, a body 4 being shown upon said frame and as containing a brake lever 5, the said lever 5 being fulcrumed at 6 and being connected through the medium of the means 7 with any appropriate brake designed to be applied on forward movement of the lower arm of the lever.

The pedestrian saving portion of my improvement comprises among other elements a platform 8, preferably made up of a frame 9 and a reticulated or textile portion 10 carried by the said frame, the said reticulated or textile portion being preferably soft so as not to injure a pedestrian when he is deposited upon the portion 10, but it will be manifest that when deemed expedient the said portion 10 may be stiff and rigid. Manifestly the portion 10 may be of cloth or may be of wire netting or other strong material. The said platform 8 is of considerable width, and is suspended from the frame 3 through the medium of links 20 and levers 21, the said levers 21 being pivotally connected at an intermediate point in their lengths to the frame bars 3 and being pivotally connected at their upper ends to a control member 22. The said control member 22 normally extends forwardly beyond the forward edge of the platform 8, and it is designed to operate when it contacts with a pedestrian overtaken by the automobile, to be thrust rearwardly and thereby force the platform 8 forwardly so that the platform 8 will serve to receive and to carry in safety the body of the pedestrian, and thereby lessen the liability of the pedestrian getting under the wheels of the automobile.

Interposed between and connected with the platform 8 and the brake lever 5 is a connection 30 by virtue of which the brake of the automobile will be automatically applied in concert with the rearward movement of the member 22 and the forward movement of the platform 8. Thus it will be understood that when the control member 22 comes into contact with a pedestrian, the rearward thrusting of the member 22 serves the twofold purpose of moving the platform 8 forwardly and applying the brakes of the automobile, and the latter in a powerful manner so as to assure the quick stoppage of the automobile.

In the said application of the brakes the connection 30 is pulled forwardly, and from this it follows that without interfering in any measure with the braking action of the connection 30, the said connection 30 may be constructed in the manner shown in Figures 1, 3 and 4, so as to assure the interruption of the ignition circuit of the internal combustion engine belonging to the automobile synchronously with the operation of the pedestrian saving means and the application of the brakes. The forward section of the connection 30 is designated by 40 and is pivotally connected at 41 to the platform 8. The rear section of the connection 30 is designated by 41 and is connected at its rear end to the upper arm of the lever 5. On the said section 41 is a slotted sleeve 42, of dielectric or insulating material, and guided in the slots of the said sleeve is an abutment 43 on the section 40, a spring 44 being interposed between the said abutment 43 and the forward end of the sleeve 42. A terminal 45 is provided on the forward portion of the sleeve 42, and connected with the said terminal 45 is a conductor 46 designed to be electrically connected with the ignition circuit of the internal combustion engine of the automobile. Manifestly when the connection 30 is pulled forwardly by forward movement of the platform 8 in the manner before described, the initial movement will have the effect of moving the section 40 relative to the section 41 so that the conductive abutment 43 will contact with the terminal 45, whereupon the ignition circuit referred to will be short circuited or in other words will be grounded to the frame of the automobile.

Following the making of the contact above described, the section 40 will pull upon the section 41 and will through the medium of the section 41 draw the forward and upper arm of the brake-lever forwardly with the result that the brake will be applied.

It will also be readily understood from the foregoing that notwithstanding the simplicity of my improvement, contact of the member 22 with the body of a person in the path of the automobile will bring about forward thrusting of the platform 8, the short circuiting or interruption of the ignition circuit, on the application of the brakes, so that immediately after the accident the automobile will be brought to a stand still.

I have specifically described the construction and relative arrangement of the parts embraced in the present and preferred embodiment of my invention in order to impart an exact understanding of said embodiment. I do not desire, however, to be understood as confining myself to the specific construction and arrangement as disclosed, my invention being defined by my appended claims within the scope of which structural changes and changes in arrangement may be made without departure from my invention.

Having described my invention, what I claim and desire to secure by Letters-Patent, is:—

1. A pedestrian saving attachment for automobiles comprising a platform movable longitudinally of the automobile at the forward end thereof, a forwardly projecting member connected with the automobile and the said platform and arranged when moved rearwardly to thrust the platform forwardly, brake applying means connected with the platform and arranged to be put in operation on forward movement of the platform, and means arranged on forward movement of the platform to interrupt the ignition circuit of the internal combustion engine of the automobile.

2. Pedestrian saving means for use on an automobile, comprising a platform movable longitudinally of the automobile at the forward end thereof, a longitudinally movable member adapted to be moved rearwardly by contact with the body of a person in front of the automobile, levers connecting said platform and member and fulcrumed on the automobile frame, a brake applying pedal, a connection between the platform and said pedal, and means included in said connection for interrupting the ignition circuit of the internal combustion engine of the automobile on forward movement of the platform.

3. Pedestrian saving means for use on an automobile, comprising a platform movable longitudinally of the automobile at the forward end thereof, a longitudinally movable member adapted to be moved rearwardly by contact with the body of a person in front of the automobile, levers connecting said platform and member and fulcrumed on the automobile frame, a brake applying pedal, a connection between the platform and said pedal, and means included in said connection for interrupting the ignition circuit of the internal combustion engine of the automobile on forward movement of the platform; the said connecting means including rod sections arranged end to end and one movable endwise relative to the other, and the circuit interrupting means including a terminal electrically connected with the ignition circuit, and a grounding terminal on one of the rod sections for contact with the first-named terminal on forward movement of the platform.

4. Pedestrian saving means for automobiles, comprising a longitudinally movable platform carried by the automobile at the forward end thereof, a longitudinally movable member adapted to contact with the body of a pedestrian and be moved rearwardly by said contact, and levers mounted on the automobile and connecting the platform and the said member, whereby rearward movement of the member will be attended by forward thrusting of the platform.

5. Pedestrian saving means for automobiles, comprising a longitudinally movable platform carried by the automobile at the forward end thereof, a longitudinally movable member adapted to contact with the body of a pedestrian and be moved rearwardly by said contact, and levers mounted on the automobile and connecting the platform and the said member, whereby rearward movement of the member will be attended by forward thrusting of the platform, in combination with a brake pedal, and a connection between the platform and said pedal whereby application of the brakes will be brought about coincident with the forward thrusting of the platform.

6. Pedestrian saving means for automobiles, comprising a longitudinally movable platform carried by the automobile at the forward end thereof, a longitudinally movable member adapted to contact with the body of a pedestrian and be moved rearwardly by said contact, and levers mounted on the automobile and connecting the platform and the said member, whereby rearward movement of the member will be attended by forward thrusting of the platform, in combination with a brake pedal, a rod section connected to and extending rearwardly from the platform, a terminal carried by said rod section, a rod section pivotally connected to and extending forwardly from the brake pedal, a sleeve on the second-named rod section and receiving the terminal bearing portion of the first-named rod section, the terminal carried by said sleeve and adapted to be electrically connected with the ignition circuit of the automobile, and a spring surrounding the first-named rod section and interposed between the terminal thereof and the forward end of the sleeve.

7. In emergency brake applying means for automobiles, rod sections arranged end to end, one of said sections being movable endwise relative to the other, and a terminal carried by one of the rod sections and adapted to be electrically connected with the ignition circuit of an automobile and to be engaged by a portion of one of the rod sections for the interruption of the ignition circuit.

In testimony whereof I affix my signature.

DUNCAN McLEAN.